Dec. 9, 1924.
A. J. KLONECK
1,518,332
ELECTRIC METER
Filed Aug. 16, 1920
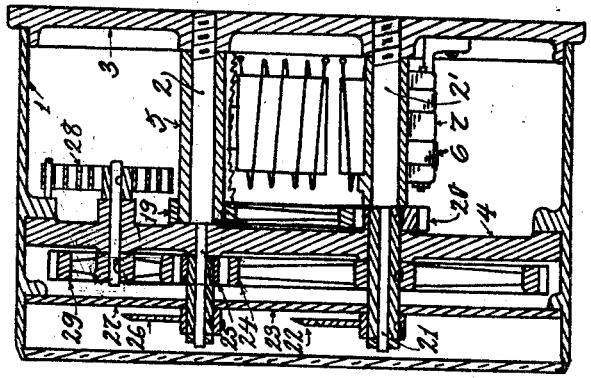
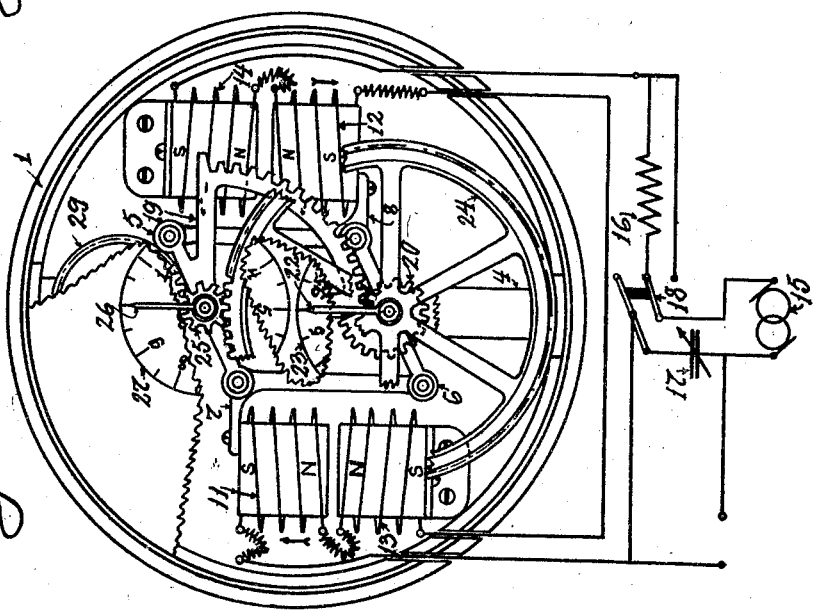
INVENTOR.
August J. Kloneck.

Patented Dec. 9, 1924.

1,518,332

UNITED STATES PATENT OFFICE.

AUGUST J. KLONECK, OF NEW YORK, N. Y.

ELECTRIC METER.

Application filed August 16, 1920. Serial No. 403,984.

*To all whom it may concern:*

Be it known that I, AUGUST J. KLONECK, a citizen of the United States, and a resident of New York, in the State of New York and county of New York, have invented certain new and useful Improvements in Electric Meters, of which the following is a specification.

This invention relates to measuring instruments for alternating currents.

One object of the invention is to arrange two magnetically opposing coils for repulsion of one another proportional to a degree of energization of the same.

Another object of the invention is to employ such two opposing coils of similar impedance and with other elements to produce a zero effective inductance for alternating currents.

A still further object of the invention is to provide suitable means for indicating the frequency, boltage or amperage of the current to be measured.

These and other allied objects are attained by a novel combination of parts hereinafter fully described and illustrated in the accompanying drawings and in which—

Figure 1 shows an elevational view of my invention, parts being shown broken away.

Figure 2 shows a sectional view of the same.

Referring more particularly to the drawing wherein similar reference characters denote corresponding parts, the numeral 1 designates a casing wherein the other parts are mounted. 2 designates a shaft which at one end is secured in a back frame 3 of the casing and at the other end in a front frame 4 of the casing 1. Another shaft 2' is arranged in parallelism to shaft 2 and similarly secured. Shafts 2 and 2' each carry two balanced arm hinges 5 and 6. The ends of the latter carry on each side one coil frame 7 and 8 and a coil 11 or 12. Opposing said coils 11 and 12 are arranged two stationary coils 13 and 14. All of said coils have an impedance similar to one another. The windings of each two cooperating coils are opposed with respect to one another, producing a magnetic pole by each coil of the same character toward its cooperating coil, adapted to produce a magnetically opposed and nonresultant magnetic field by the coils.

The impedance characteristics of each coil should be similar to each other coil so that the same can be employed in shunt to one another if desired. If will be noted that the number of turns upon each coil will depend upon the use of the same, as for instance, if employed as a voltmeter or galvanometer a high resistance and consequently a large number of turns will be needed, so that all coils may also be in series connected with one another and perhaps additional resistance and a condenser; while if used as an amperemeter in electrical circuits the coils will have but few turns so that the coils may be connected in shunt to each other for larger current or additional resistance shunted with the coils. Assumed, the instrument is employed as a voltmeter for direct current or for alternating current so that the same will be employed in shunt to a source of current 15 which if it is an alternator of high tension or frequency then the coil 11, 12, 13 and 14 are connected in series of one another and with a resistance 16, and condenser 17 by a switch 18, as shown.

By using the instrument as a frequency meter, then the meter will be tuned to a higher limit of frequency by means of the condenser 17 and the inductance of the generator armature coils. Thus, by employing the meter for indicating a 150,000 cycle frequency, then the meter is tuned to a range of 200,000 cycles, for instance. In such case, an increase of a frequency will approach its tuned reactance and reduce its natural resistance, permitting a greater amount of current to flow through the meter and thus indicate a higher frequency proportionally at its calibration, while a decrease of the frequency in the meter circuit is still more detuned which will reduce a current flow and indicate a lower frequency. It will be clear that the meter may also be used with a wave meter in the usual manner.

For the purpose of obtaining a reading of the meter, the hinge 5 comprises a gear section 19 mounted thereon which latter meshes with a small pinion 20 on a stud 21. Attached with pinion 20 is a pointer 22 which moves upon a scale 23 and further another gear 24 which latter engages a ten times smaller gear 25 so as to produce a complete turn of gear 25 and a pointer 26 upon a unit scale 27 for each one tenth turn of gear 24 and tens indicating pointer 22. The gear section 19 and pinion 20 is shown as having the teeth arranged on an eccentric circumference for the purpose of obtaining an equal scale division regardless of the movements of the coils by a low and high current value to be measured. The motion of the coils is restricted by a spring 28 which engages by another gear set 29 the gear 25 and by this arrangement causes a precise movement and indication of the meter.

Having now fully described my invention, I claim as new and desire to secure by Letters Patent—

1. An instrument for electrical measurements comprising coils arranged for magnetically opposing one another so that the coils repulse one another, means connected with said coils for indicating the power of repulsion of said coils upon each other, a movable crank connected with said indicating means, and means for attaching a coil to said movable crank for actuating said indicating means.

2. An instrument for electrical current measuring comprising a plurality of magnetically opposing coils of similar character arranged for repulsing one another when energized by electrical currents, and means adapted for indicating the force of repulsion with which said coils act upon one another, said last means comprising a large current quantity indicating means operated first by said coils and smaller units indication means operated by said coils through said first indicating means, and means for acting against a movement of said coils from the zero position.

3. An instrument for electrical current measurements, comprising four similar coils, comprising two stationary coils and two movable coils, an axis, and means adapted for attaching said movable coils on opposite ends of said last means with respect to said axis, each of said stationary coils opposing one of said movable coils, said coils being connected together in a manner so as to repulse one another electromagnetically, means for acting against a repulsive movement of said coils and means for indicating a movement of said movable coils, all for the purpose set forth.

4. A measuring instrument for electrical current, comprising opposing cooperating coils, an indicating device including means operated by a movement of said coils, said movement comprising two counterbalanced parallel movable levers, means for connecting the ends of said levers, said connecting means of said levers, carrying said movable coils so as to produce a parallel axial movement of said movable coils, all for the purpose set forth.

5. An electric meter including two pairs of magnetically repulsing coils, of a two arm counterbalancing lever, means for arranging two of said coils at the opposite arms of said lever, an indicating device and means for operating the latter by means of said movable coils and lever, and means for counteracting the movement of said lever and coils, the latter acting through said indicating device.

6. A measuring instrument including a plurality of similar repulsion coils arranged in an operative relation with one another, means for balancing the weight of said coils which are movable, means for indicating units and multiples by said meter, means for operatively connecting said indicating means and said movable coils, and means for retarding a movement of said indicating means, whereby the latter acts through said unit indicating means.

In testimony whereof I hereunto sign my name to this specification in the presence of two witnesses, this 10th day of July 1920.

AUGUST J. KLONECK.

Witnesses:
JULIUS BRUMMEL,
HARRY CHOCUBEL.